March 27, 1962 H. SZCZEPANSKI 3,026,612
VEGETABLE PEELER
Filed Aug. 26, 1959 2 Sheets-Sheet 1
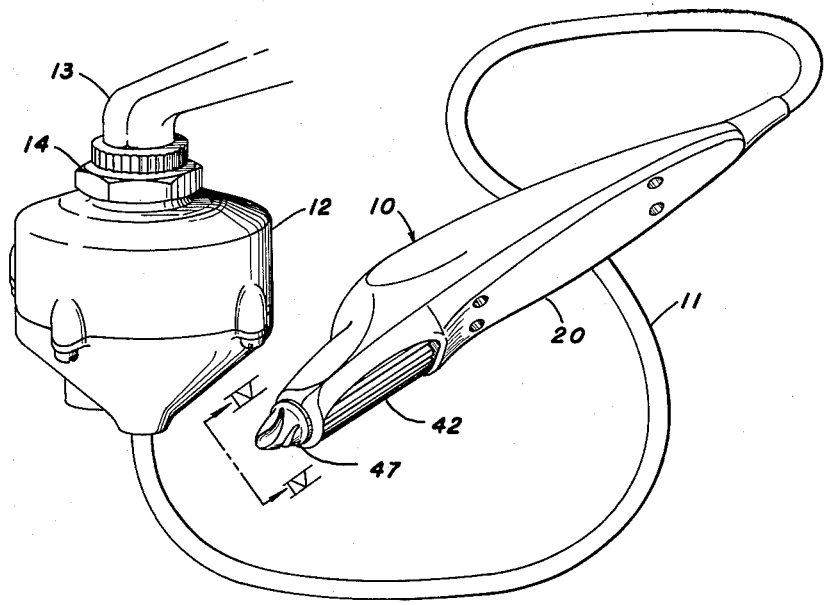
Fig. 1
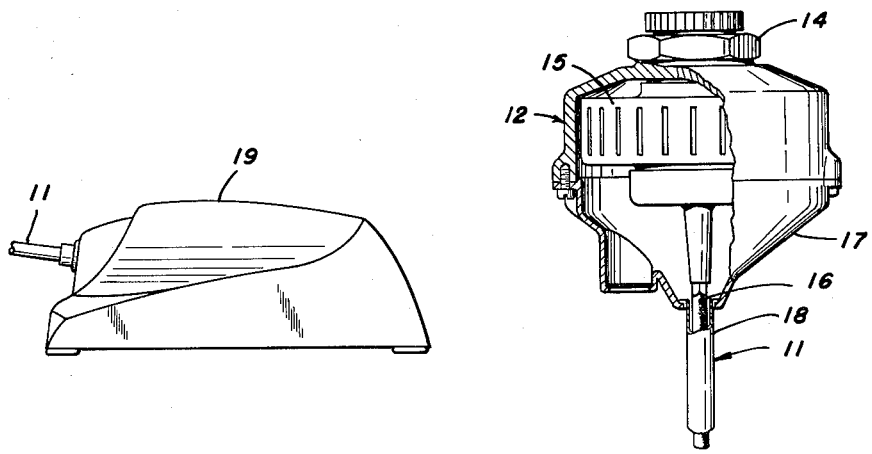
Fig. 2
Fig. 3
INVENTOR:
HARRY SZCZEPANSKI
BY
*Glenn B. Morse*
atty.

March 27, 1962  H. SZCZEPANSKI  3,026,612
VEGETABLE PEELER
Filed Aug. 26, 1959  2 Sheets-Sheet 2
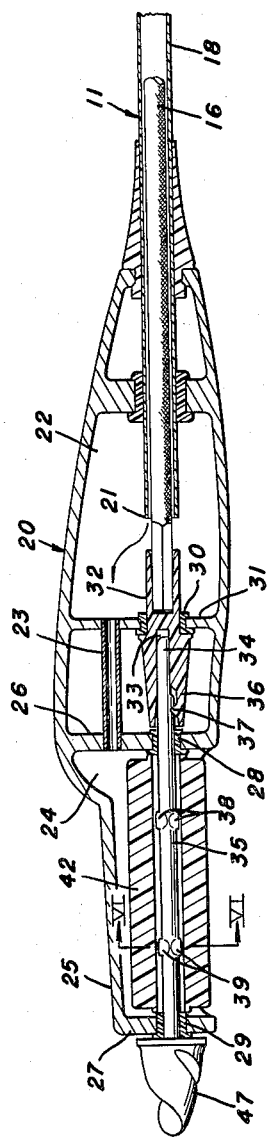
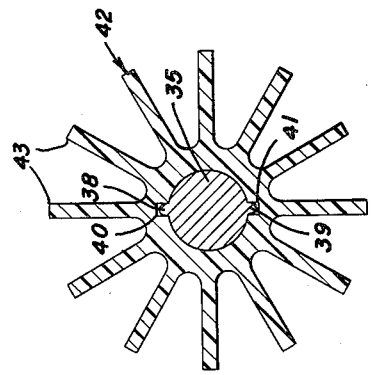
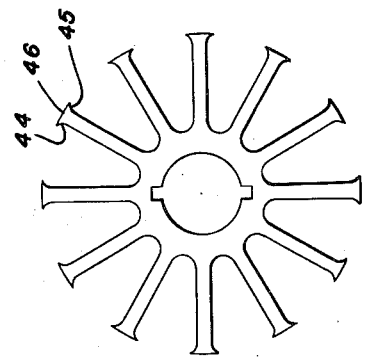
HARRY SZCZEPANSKI
INVENTOR.

United States Patent Office

3,026,612
Patented Mar. 27, 1962

3,026,612
VEGETABLE PEELER
Harry Szczepanski, 755 Oakleigh, Grand Rapids, Mich.
Filed Aug. 26, 1959, Ser. No. 836,126
4 Claims. (Cl. 30—123)

This invention provides a power tool for peeling vegetables. The preferred form of the invention involves the use of a flexible shaft for transferring power from a hydraulic motor, but the device has also been found to operate very effectively with other sources of power supplied to the flexible shaft. When the hydraulic motor is used, means are also provided for conducting the exhaust flow from the hydraulic motor through the tubular casing of the flexible shaft to the cutting area of the tool. This flow establishes a flushing action which seems to facilitate the functioning of the cutter and keep the tool free of any tendency for the removed particles of vegetable material to pack.

The action of the tool is based upon a rotary member which includes a series of angularly-spaced vanes projecting axially and radially from a hub. Considerable experimenting has established a preferable wall-thickness of these vanes, and a relationship between the circumscribed diameter and the vane spacing. It is not known with certainty whether the action of the tool involves a cutting of the skin particles from the surface of the vegetable, or whether this process is more accurately described as an abrading or scuffing action. In any event, it has been found that the formation of the cutter from extruded or molded nylon, when the diameter, vane spacing, and wall thickness is of the preferred dimensions, results in a rotor which keeps itself clear of accumulations of vegetable particles in a very remarkable manner. It is probable that the flexing action of the blades and the nature of the particles removed from the vegetable combine to produce this effect.

The several features of the invention will be analyzed in detail through a discussion of the particular embodiments illustrated in the accompanying drawings. In the drawings:

FIGURE 1 presents a perspective view showing a complete device incorporating a hydraulic motor connected to a conventional faucet.

FIGURE 2 presents a side elevation showing an electric motor usable as an alternative to the hydraulic motor.

FIGURE 3 is a fragmentary section showing some of the structural details of the hydraulic motor.

FIGURE 4 presents an axial elevation of the peeling tool.

FIGURE 5 presents a view on an enlarged scale taken on a plane perpendicular to the axis of rotation, and showing the details of a rotary cutter.

FIGURE 6 presents a section taken on a plane perpendicular to the axis of rotation, and showing a modified form of a rotary cutter.

Referring to the drawings, the peeling tool indicated generally at 10 in FIGURE 1 has a flexible shaft 11 powered by the hydraulic motor 12 coupled to the conventional faucet 13 by a standard type of connector 14. The details of the hydraulic motor unit form no part of this invention, and the illustration of FIGURE 3 follows conventional principles of machine design, except for the utilization of the exhaust flow from the device. The rotor 15 causes a peripheral discharge of water at considerable velocity in the upper portion of the housing 12, which induces a rotation transferred to the core 16 of the flexible shaft 11. The lower portion 17 of the housing collects this flow of water, and conducts it to the space between the core 16 and the tubular outer casing 18 of the flexible shaft assembly. This flow is conducted to the peeling tool 10 to flush the accumulations of vegetable particles away from the cutting area.

It has been found that most vegetables, in their usual state, have a sufficient amount of water within the vegetable tissues for the device to operate satisfactorily without the use of the flushing flow referred to above. This is particularly true if the peeling operation can be conducted where a wash of water from an outside source can be applied periodically so that the tool and the vegetable can be kept fairly wet. With this arrangement, a non-hydraulic power source such as that illustrated in FIGURE 2 can be used. This figure of the drawings presents a proposed form of a power unit in which a conventional electric motor is mounted within a housing 19, and which contains a suitable coupling for engaging the flexible shaft 11.

The cutting tool itself is best shown in FIGURE 4. A housing 20 is preferably formed in the shape of a hand grip, and serves as a terminal for the flexible shaft assembly 11. In the form of the device used in conjunction with the hydraulic motor illustrated in FIGURE 1, the flow within the flexible shaft assembly emerges at the end 21 of the tubular outer casing, and passes through the chamber 22 and the conduit 23 into the space 24 defined by the rotor shield 25. The cutting tool shown in FIGURE 4 may also be used with the electric motor unit shown in FIGURE 2 without alteration, the fluid flow arrangements simply not being used with that source of power.

The housing 20 is formed with the transverse walls 26 and 27 which are provided with bearing inserts as shown at 28 and 29, respectively. An additional bearing 30 is mounted in the transverse wall 31 for receiving the coupling 32 secured to the end of the core 16 of the flexible shaft assembly. The coupling includes a section having a non-circular recess 33 for receiving the similarly-formed end 34 of the shaft 35. The coupling also has a radially-movable finger 36 having a detent 37 for engaging a notch in the shaft 35 to retain it in engagement with the coupling.

The shaft 35 has the radial extensions 38 and 39 for engaging the opposite keyways 40 and 41, respectively, of the rotor 42. This rotor is preferably of extruded or molded nylon, and it has been found that there is a relationship between the thickness of the vanes 43, the circumscribed diameter, and the vane spacing. A very effective tool has been found to be based upon a circumscribed rotor diameter of five eighths of an inch, using twelve evenly-spaced vanes having a wall thickness of approximately twenty-five thousandths of an inch. The form of the rotor shown in FIGURE 5 is similar in construction to that of FIGURE 6, except for the replacement of the square ends of the vanes of the FIGURE 6 modification with a configuration in which the outer extremities of the vanes are defined by arcuate surfaces 44 and 45 which intersect the end surfaces 46 to form a cutting edge.

It is preferable that the shaft 35 have a portion which extends through the wall 27 for mounting the burr 47. This form of the device has been found very successful in removing the eyes of potatoes, and other portions requiring some depth penetration. In either of the forms of the cutter shown in FIGURES 5 and 6, the serviceability of the cutter is increased by the fact that the shaft 35 can be disengaged by pulling it axially to the left, as shown in FIGURE 4, using the burr as a handle to manipulate the shaft. The tool may be then reversed end-for-end, which results in presenting a different edge of the vanes for the cutting operation. The formation of the bearing 29 must be such as to permit the passage of the key extensions 38 and 39.

The action of the cutter 42 is quite remarkable in that it removes so little of the material of the vegetable. When proportioned as shown, it seems to scuff off the outer layers of skin from a potato, carrot, or other such vegetable, and leave intact practically all of the material lying underneath the skin. It has been found preferable to drive the device with left-hand rotation, so that a right-handed user will experience a tendency of the machine to move toward him as he touches a vegetable. The movements of the user then tend to be a series of reciprocating movements in which the tool is pushed away from the user along the surface of the vegetable.

The shield 25 partially surrounding the rotor 42 seems to keep itself remarkably clear of accumulations of vegetable material during the cutting operation if any substantial amount of water is present, either through the use of the flushing system provided by a hydraulic source of power, or by the presence of an occasional wash of water applied as the cutting action proceeds. It appears that the rotation of the rotor serves to induce a flow of water on one side of the rotor, and move it around in the space between the rotor and the housing at a sufficient velocity to carry vegetable particles with it.

The particular embodiments of the present invention which have been illustrated and described herein are for illustrative purposes only and are not to be considered as a limitation upon the scope of the appended claims. In these claims, it is my intent to claim the entire invention disclosed herein, except as I am limited by the prior art.

I claim:

1. A vegetable peeler, comprising: a housing including a rotor shield opening on one side; a rotor mounted for rotation with respect to said housing opposite said shield, said rotor having twelve radially extending axial vanes of a wall thickness of approximately twenty-five thousandths of an inch and a circumscribed diameter of five-eighths of an inch, said rotor being of plastic material similar to nylon, said rotor having a central bore and an axial keyway; a shaft rotatably mounted in said housing opposite said shield and engaging said bore and keyway, said shaft having an axially disengageable coupling; and drive means for said shaft.

2. A vegetable peeler, comprising: a housing including a rotor shield opening on one side; a rotor mounted for rotation with respect to said housing opposite said shield, said rotor having a plurality of radially extending axial vanes of a wall thickness of approximately twenty-five thousandths of an inch and a circumscribed diameter of five-eighths of an inch, said vanes each having a height at least four times the thickness thereof, and said rotor being of plastic material similar to nylon; and drive means for said rotor.

3. A vegetable peeler, comprising: a housing including a rotor shield normally opening exclusively on one side and having bearing means traversing the opposite ends thereof; a rotor mounted for rotation with respect to said housing opposite said shield, said rotor having a plurality of flexible radially extending axial vanes and having a central bore and an axial keyway; a shaft rotatably mounted in said bearings and engaging said bore and keyway, said shaft having an axially disengageable coupling and being axially withdrawable through one of said bearings; and drive means for said shaft.

4. A vegetable peeler, comprising: a housing including a rotor shield opening on one side; a rotor mounted for rotation with respect to said housing, said rotor having a plurality of flexible radially extending axial vanes; and drive means for said rotor including hydraulic motor means and flexible shaft means having an outer tubular member; and conduit means including said tubular member connected to conduct the exhaust flow of said hydraulic motor means to said shield to flush said shield.

References Cited in the file of this patent

UNITED STATES PATENTS

| | | |
|---|---|---|
| 1,265,790 | Kirby | May 14, 1918 |
| 1,673,094 | Stack | June 12, 1928 |
| 1,886,061 | Speidel | Nov. 1, 1932 |
| 2,117,765 | Johnson | May 17, 1938 |
| 2,481,182 | Waters | Sept. 6, 1949 |
| 2,720,002 | Waters | Oct. 11, 1955 |
| 2,835,919 | Colburn et al. | May 27, 1958 |
| 2,884,658 | Johnson | May 5, 1959 |

FOREIGN PATENTS

| | | |
|---|---|---|
| 241,319 | Great Britain | Oct. 22, 1925 |
| 505,515 | Great Britain | May 12, 1939 |